United States Patent
Bindana et al.

(10) Patent No.: US 11,340,852 B1
(45) Date of Patent: May 24, 2022

(54) METHODS AND SYSTEMS FOR PROVIDING KEYWORD-BASED PRINTING TO A USER

(71) Applicant: XEROX CORPORATION, Norwalk, CT (US)

(72) Inventors: Srinivasarao Bindana, Kakinada (IN); Dara N Lubin, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/235,091

(22) Filed: Apr. 20, 2021

(51) Int. Cl.
*G06F 3/12* (2006.01)

(52) U.S. Cl.
CPC .......... *G06F 3/1265* (2013.01); *G06F 3/1204* (2013.01); *G06F 3/1205* (2013.01); *G06F 3/1256* (2013.01)

(58) Field of Classification Search
None
See application file for complete search history.

(56) References Cited

U.S. PATENT DOCUMENTS

| 10,956,107 | B1 | 3/2021 | Gopalakrishnan et al. |
| 2008/0037065 | A1* | 2/2008 | Kawata ................. G06F 21/608 358/1.16 |
| 2014/0139861 | A1* | 5/2014 | Minamizono ......... G06F 3/1288 358/1.15 |
| 2016/0269587 | A1* | 9/2016 | Garces ............... H04N 1/00663 |
| 2017/0004147 | A1* | 1/2017 | Ozawa .............. H04N 1/00244 |

* cited by examiner

*Primary Examiner* — Henok Shiferaw

(57) ABSTRACT

The disclosure discloses methods and systems for keyword-based printing. The method includes receiving a request for printing a document from a user. Upon receiving the request, a user interface including a keyword-based printing option is provided to the user. The keyword-based printing option allows the user to input one or more keywords. Based on the one or more input keywords, one or more pages from the document having the one or more matching keywords are identified. The pages identified to include the one or more keywords are excluded and the remaining pages of the document are printed.

22 Claims, 6 Drawing Sheets

METHODS AND SYSTEMS FOR PROVIDING KEYWORD-BASED PRINTING TO A USER

TECHNICAL FIELD

The present disclosure relates to the field of printing, and more particularly to methods and systems for providing keyword-based printing to a user that allows the user to exclude one or more pages from a document for printing.

BACKGROUND

Typically, a user submits a print command via a print driver application installed on his computing device. The application provides various print parameters for submitting a document for printing. For example, if a user wishes to print only few pages of the document, the print driver allows the user to select page numbers or page ranges that are to be printed. Sometimes, there are scenarios when the user wishes to print all pages of the document except a few pages. For example, a user who is willing to print a book may not wish to print preface and index sections.

Currently, the user is required to enter the page numbers/ranges except the page numbers of the sections that are not required to be printed. This requires the user to perform multiple steps—the user first identifies the page numbers of the preface and index sections that are to be excluded. Based on this, the user identifies other page numbers/range that are to be printed. Sometimes when the document is lengthy, the user is required to note down the pages that are to be printed and then enters the required pages via the print driver.

According to some solutions, the user may search for the keywords manually, separate the pages including the keywords and then print the remaining pages. But sometimes, it is difficult for the user to separate the required pages from the pages that are not required to be printed. In view of this, there is a need for methods and systems that can allow the user to exclude pages from a document that are not required to be printed.

SUMMARY

According to aspects illustrated herein, a method for providing keyword-based printing to a user is disclosed. The method includes receiving a request for printing a document from a user, where the document includes one or more pages. Based on the received request, a user interface including a keyword-based printing option is provided to the user for selection, where the keyword-based printing option allows the user to input one or more keywords. The one or more input keywords along with the document are then sent for further processing and printing. Then, the one or more pages having the one or more matching keywords as input by the user are identified from the document. The identified one or more pages are excluded from the document for printing, and the remaining pages of the document are printed.

According to further aspects illustrated herein, a system for providing keyword-based printing to a user is disclosed. The system includes a computing device having a print driver. The print driver receives a request for printing a document from a user, where the document includes one or more pages. The print driver provides a user interface including a keyword-based printing option to the user for selection, where the keyword-based printing option allows the user to input one or more keywords. The print driver sends the one or more input keywords along with the document to a multi-function device for further processing and printing. The multi-function device identifies one or more pages from the document having the one or more matching keywords input by the user. The multi-function device excludes the identified one or more pages from the document for printing and prints the remaining pages of the document.

According to additional aspects illustrated herein, a method for providing keyword-based printing to a user is disclosed. The method includes receiving a document for printing from a user, where the document includes one or more pages. A user interface including a keyword-based printing option is provided to the user for selection, where the keyword-based printing option allows the user to input one or more keywords. One or more pages having the one or more matching keywords input by the user are identified from the document. The identified one or more pages are excluded from the document for printing. Subsequently, the remaining pages of the document are printed and the one or more identified pages having the one or more matching keywords are not printed.

According to further aspects illustrated herein, a multi-function device for providing keyword-based printing to a user is disclosed. The multi-function device includes a receiver for receiving a document for printing from a user, where the document includes one or more pages. The multi-function device includes a user interface including a keyword-based printing option for user selection, where the keyword-based printing option allows the user to input one or more keywords. The multi-function device further includes a controller. The controller identifies one or more pages from the document having the one or more matching keywords input by the user. The controller then excludes the identified one or more pages from the document for printing. The multi-function device further includes a print engine for printing the remaining pages of the document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
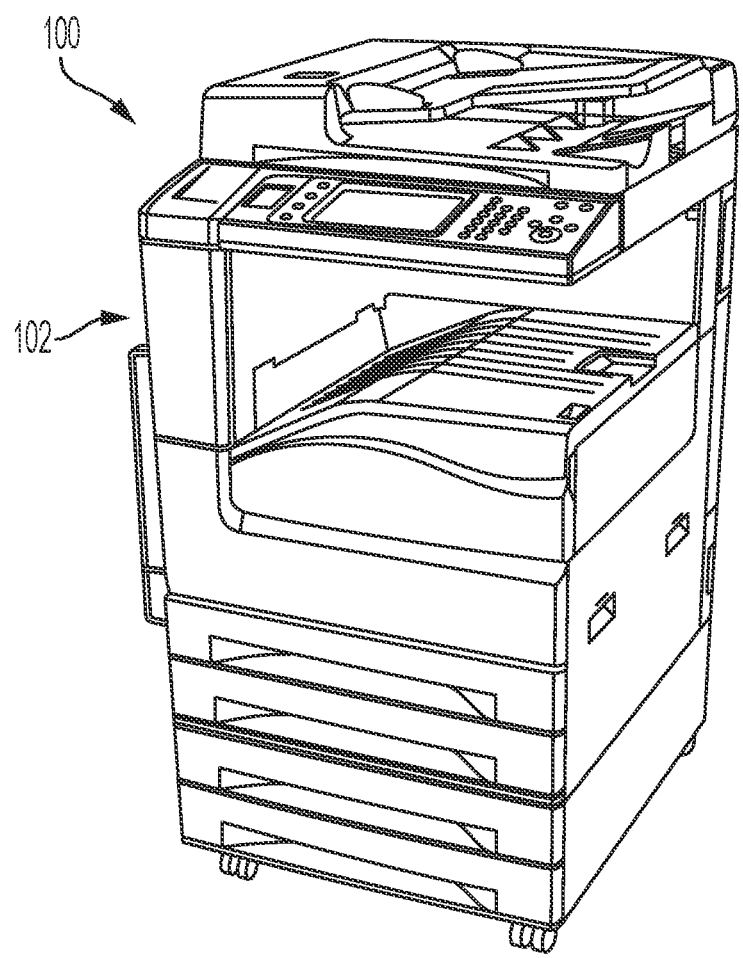
FIGS. 1A-1B show exemplary environments in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

As used herein, a "multi-function device" is a single device or a combination of multiple devices, to perform one or more functions such as, but not limited to, printing, imaging, scanning, and so forth. The multi-function device may include software, hardware, firmware, and combination thereof. In the context of the current disclosure, the multi-function device provides a keyword-based printing to a user. The keyword-based printing allows a user to input one or more keywords such that one or more pages of a document including the input keywords are excluded from printing and the remaining pages of the document are printed.

The term "computing device" refers to a device that a user typically uses for giving print commands and other purposes. Examples of the computing device include, but are not limited to, a personal computer, a desktop, a laptop, a mobile phone, a tablet, a Personal Digital Assistant (PDA), a smart-phone or any other device capable of data communication. The computing device includes a print driver application that allows the user to submit print commands, one or more print parameters, and a document for printing. In context of the present disclosure, the print driver application includes a keyword-based printing option that allows a user to exclude one or more pages of a document from printing, while the remaining pages of the document are printed.

The term "document" refers to any document including one or more pages. The document can be in a virtual or software form (embodied in a software file). The virtual form can also be referred to as digital form, electronic version or the like. The document may be an input to the multi-function device or a print driver application.

The term "keywords" refer to one or more keywords that a user inputs to find one or more pages in the document having the matching keywords. The keywords may be in the form of text, alphabets, numeric, alphanumeric, image, graphics, or a combination of these. In context of the current disclosure, the pages including the matching keywords are the pages that are to be excluded from printing, when the user prints the document.

The term "matching" refers to the one or more keywords that are either exact same or related to the one or more keywords input by the user. For example, if a keyword input by the user is 'Image', some of the matching keywords can be 'Image', 'Images', 'Pictures', 'Figures' and so on. In context of the present disclosure, when the user inputs one or more keywords while printing the document, one or more pages including the matching keywords are identified in the document. The matching keywords can be acronyms, synonyms, substitutions, short forms, or keywords that are associated to the input keywords, e.g., short names related to the input keyword, substitutions, or shortcuts set forth by a user.

The term "excluding one or more pages" refer to pages of the document that are to be excluded from printing, while printing a document. The pages that are to be excluded from printing are the unnecessary page or may be the pages that are not important for the user. These pages may be any types of pages that the user does not wish to print. For examples, while printing a document, the user may wish not to print pages such as index page, table of content, etc. and thereby excludes these pages from the document while printing the remaining pages of the document.

The "remaining pages" refer to pages of the document that are to be printed. In context of the current disclosure, the remaining pages do not include the one or more keywords that are input by the user. For example, if the user submits a document having 5 pages for printing and 2 of the 5 pages include an input keyword, the other 3 pages are considered to as remaining pages of the document.

Overview

The present disclosure discloses methods and systems to automatically exclude one or more pages from a document that is submitted for printing and print remaining pages of the document. The methods and systems propose a new feature to exclude pages including one or more keywords that are input by a user. Unlike conventional methods and systems, the user is not required to manually identify and/or remember the page numbers that are to be excluded, and then input page numbers that are to be printed. And the present disclosure provides an easy approach to exclude pages that are not required by the user who is printing the document.

The methods and systems allow the user to enter one or more keywords based on which pages including the input keywords can be excluded and remaining pages can be printed. For example, if a user is printing a book, he can exclude pages such as preface page, index page, and print the remaining pages that are needed. The methods and systems allow the users to easily remove and/or exclude the pages that are not required while printing the remaining pages of the document, thereby saves user's time and effort.

Exemplary Environment

FIG. 1A shows an exemplary environment 100 in which various embodiments of the disclosure can be practiced. The environment 100 includes a multi-function device 102. Various examples of the multi-function device 102 may be a printer, a scanner, a multi-function peripheral device, or the like. The multi-function device 102 provides one or more functionalities such as printing, scanning, imaging, copying, and so on. In context of the present disclosure, the multi-function device 102 provides a functionality to exclude one or more pages from a document for printing. The multi-function device 102 provides a keyword-based printing to a user that allows him to exclude one or more pages of the document from printing and allows him to print remaining pages of the document.

In operation, the user submits a document having one or more pages at the multi-function device 102, for printing. The user may plug in a Universal Serial Bus (USB) drive to submit the document at the multi-function device 102. But in other scenarios, the document can be available in a hard disk, in a memory of the multi-function device 102, or may be downloaded from a network or a shared location that can be accessible through the multi-function device 102. It can be considered that the user may use any suitable known or later developed ways to submit the document. Once submitted, the multi-function device 102 provides an option for excluding one or more pages of the document for printing, while printing remaining pages of the document. The user selects the option such that selecting the option allows the user to input one or more keywords. The user inputs the one or more keywords. Based on the input one or more keywords, the multi-function device 102 searches for the keywords in the document and identifies one or more pages having the matching keywords. The identified one or more pages are then excluded, and the remaining pages of the document are printed. For example, while submitting a book for printing, a user can exclude 'preface and index sections by entering the keywords 'Index' and 'Preface' via a user interface of the multi-function device 102. Based on the input keywords, the multi-function device 102 searches for the input keywords in the document and identifies and exclude the pages for printing having the matching input keywords. This way, the multi-function device 102 saves user's time and effort by excluding the one or more pages of the document that are not required to be printed.

Figure 1B:
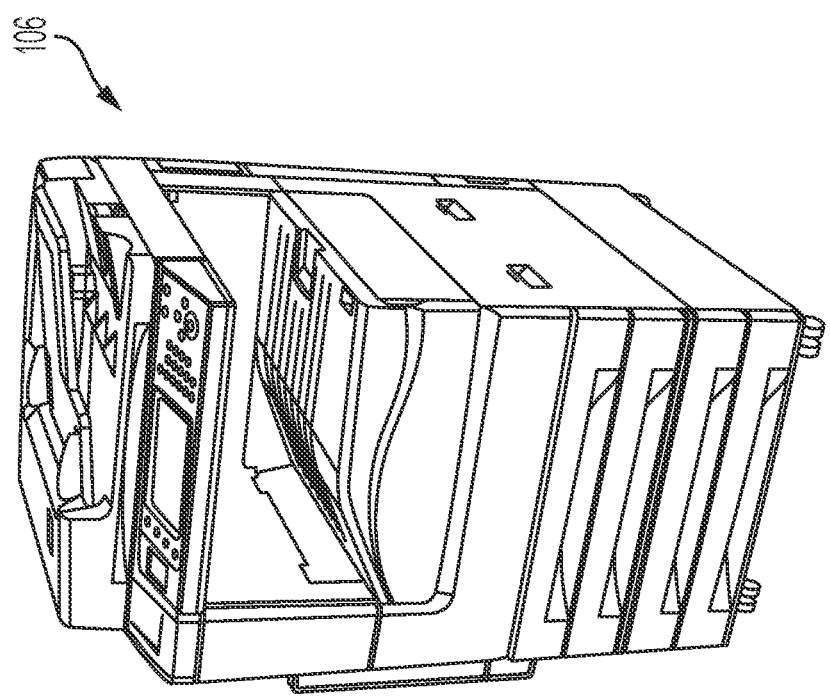
Figure 1B:
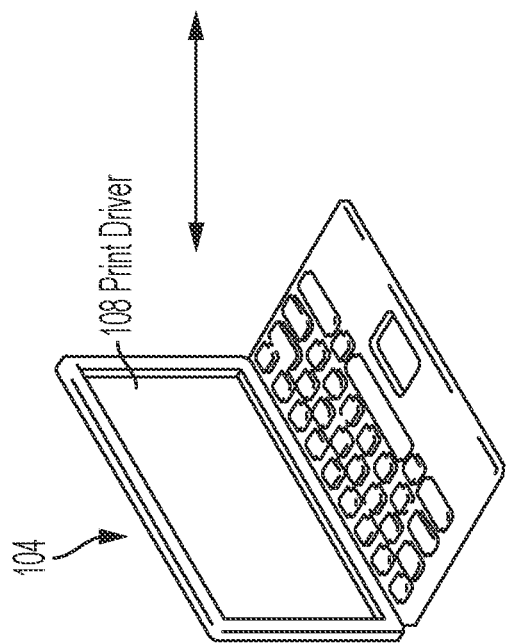

FIG. 1B shows another exemplary environment in which various embodiments of the disclosure can be practiced. The environment includes a computing device 104 that is communicatively coupled to a multi-function device 106. A user uses the computing device 104 for his day-to-day tasks such as chatting, emailing, surfing, submitting documents for printing, or the like. Various examples of the computing device 104 may be a laptop, a personal computer, a mobile device, a personal digital assistant or any known or later developed computing device.

The computing device 104 is coupled to the multi-function device 106 through a communication network (although not shown). The communication network may be a wireless network, a wired network or a combination thereof. The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like. The computing device 104 and the multi-function device 106 collectively forms a system.

The computing device 104 runs several applications and software for functioning of the computing device 104. One such example is a print driver 108. The print driver 108 allows a user to give print commands and submit a document for printing. The print driver 108 further allows the user to select a number of print parameters such as print all pages, print selected pages, double-sided print, single-sided print, print job type, quality, destination, and so on. Once the user selects one or more print parameters, the print driver 108 submits the document for printing to a device, such as the multi-function device 106.

In context of the present disclosure, the print driver 108 includes an option that allows the user to exclude one or more pages of the document from printing. The option is provided at the time of setting up print parameters/options. The option allows the user to input one or more keywords based on which one or more pages including the matching keywords are identified and excluded from printing, while the remaining pages of the document are printed.

In the print setup/print driver 108, the user is provided with all the regular options and the proposed option to exclude pages with keywords. As user selects the option to exclude the pages with input keywords, the print driver 108 provides an option to enter or input one or more keywords. The print driver 108 receives the one or more keywords from the user, where the user wishes to exclude the pages having the matching one or more keywords. Subsequently, the print driver 108 sends the one or more keywords and the document to the multi-function device 106 for processing and printing. The multi-function device 106 searches the document to identify the one or more keywords and exclude the pages including the matching keywords. Finally, the pages that do not include the one or more input keywords are printed.

While in the above scenario, the multi-function device 106 searches the document to identify the keywords, in other cases, this functionality of searching can be included in the print driver 108. In such case, the print driver 108 searches the document for the one or more keywords and identify one or more pages having the matching keywords. The print driver 108 then tags the pages having those keywords. Subsequently, the print driver 108 sends the tagged pages having keywords and remaining pages to the multi-function device 106 for printing. Here, the multi-function device 106 excludes the pages tagged to include the input keywords and prints the remaining pages that do not include the input keywords.

In this manner, the present disclosure provides a feature where some pages of the document that are not important for the user can be excluded from printing, while the remaining pages can be printed.

Further, the one or more keywords used to exclude pages from the document may be text, alphabets, numeric, alpha-numeric, images, graphics or the like. For example, if the keyword is "crypto currency", then all pages having the exact same or matching keyword such as "crypto currency", "crypto", "currency", "crypto-currency", etc. are excluded. It can be considered that pages that do not include exact keywords but include acronyms, synonyms, substitutions, short forms, etc. are also considered while identifying the pages including the input keywords. For example, if a keywords input by the user is 'Preface', some of the matching keywords that are searched can be 'foreword', 'preamble', 'prologue', and so on. The numeric keywords can be employee code, passcode, other numeric identifiers. Further, the keyword can be any image such as logo, diagram, signatures, or any other picture. The user can upload the image via the print driver 108 and all the pages having matching images are identified. Similarly, the keyword can be logo, design, or the like. The user can upload the graphics via the print driver 108.

In the environment of FIG. 1A, the document is submitted directly at the multi-function device 102 and the multi-function device 102 standalone performs all the functions including providing the user interface having the option to exclude one or more pages from the document submitted for printing, searching the document for the input keywords, identification of one or more pages including the input keywords, and printing the remaining pages that do not include the keywords. However, in the environment of FIG. 1B, the document is submitted from the computing device 104 such that the print driver 108 provides the user interface including the option to exclude one or more pages from the document. Once the user inputs one or more keywords, the document and user selected keywords are submitted to the multi-function device and all the other functionalities such as searching of the document, identification of one or more pages including the input keywords, excluding pages having input keywords, and printing of remaining pages are performed by the multi-function device 106.

Exemplary System

Figure 2:
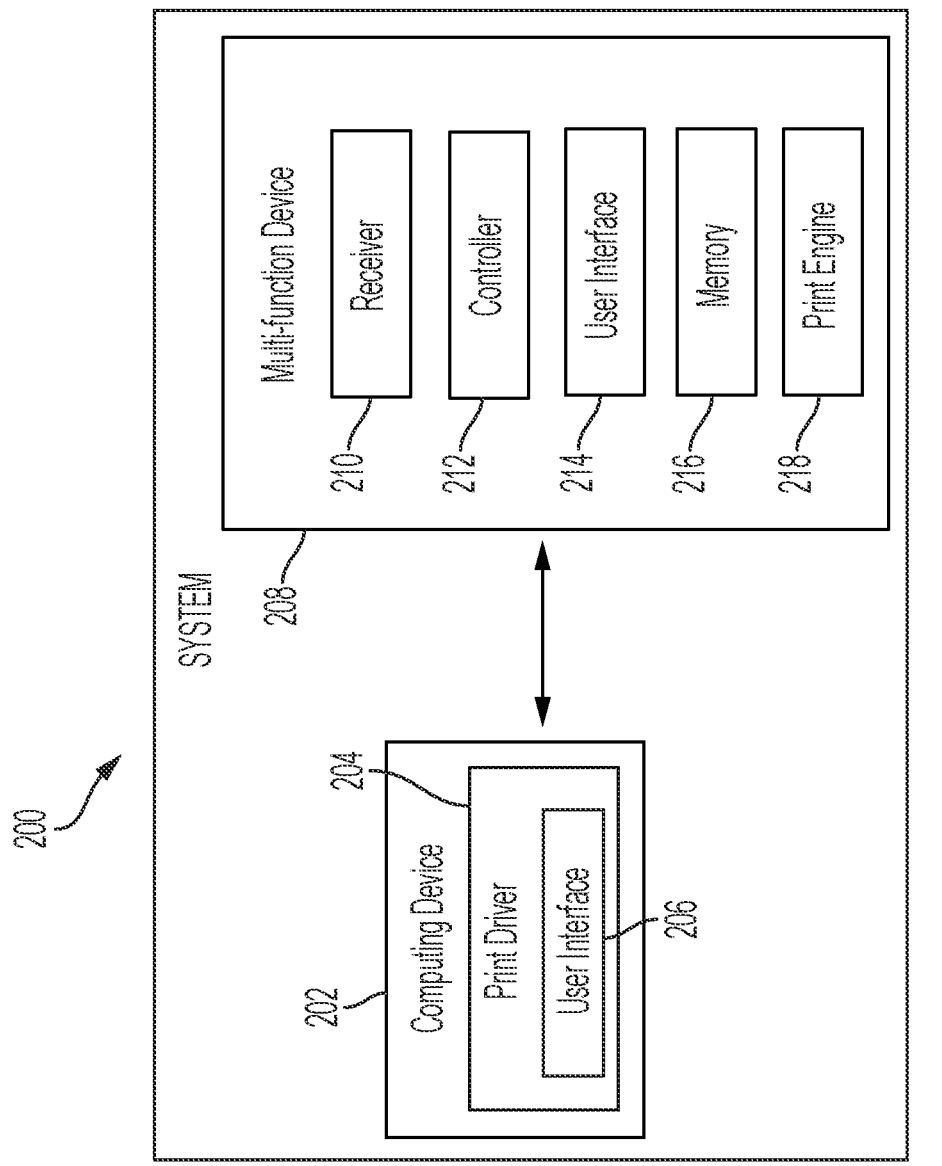
FIG. 2 is a block diagram illustrating a system and its components, in accordance with an embodiment of the present disclosure.

FIG. 2 is a block diagram of a system 200 including a computing device 202 and a multi-function device 208, for implementing the current disclosure. As illustrated, the computing device 202 includes a print driver 204 having a user interface 206. The computing device 202 is communicatively coupled to the multi-function device 208 via a communication network (although not shown) to perform various tasks such as sending a document for printing or any other tasks required for implementing the current disclosure. Although not shown explicitly, the computing device 202 may further include additional component(s) as required to implement the present disclosure. Further, the multi-function device 208 includes a receiver 210, a controller 212, a user interface 214, a memory 216, and a print engine 218. The multi-function device 208 may further include additional component(s) as required to implement the present disclosure. Also, the multi-function device 208 may perform functions and operations similar to the multi-function device 106 of FIG. 1B.

The implementation begins when a user wishes to submit a document having one or more pages for printing. The user uses the computing device 202 to submit the print request. Once submitted, the print driver 204 receives the request for printing the document having one or more pages. Upon receiving the request, the print driver 204 provides the user interface 206 to the user. The user interface 206 displays a keyword-based printing option along with other print parameters such as print all pages, print on both sides, orientation, and so on. The keyword-based printing option allows the user to input one or more keywords such that pages including the input one or more keywords are excluded from printing and remaining pages of the document are considered for printing.

Upon selecting the option, the user interface 206 allows the user to enter one or more keywords. In other words, once the user selects the option, he is required to enter or input one or more keywords via the user interface 206. Based on the input one or more keywords, one or more pages including input keywords are to be identified and excluded from printing. The option is provided to the user before submitting the document for printing.

Figure 3:
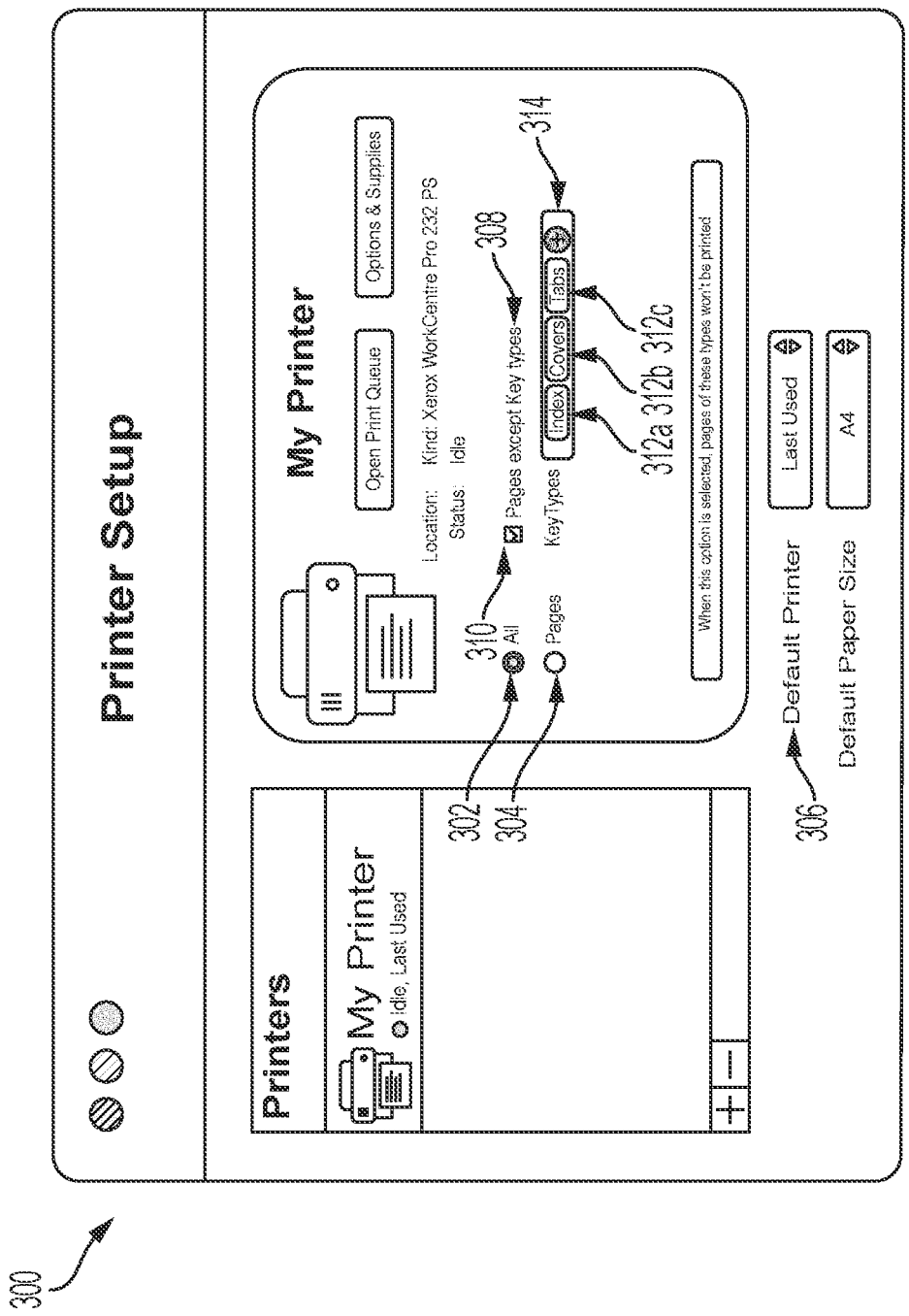
FIG. 3 shows an exemplary user interface including a keyword-based printing option, in accordance with an embodiment of the present disclosure.

One exemplary snapshot of a user interface 300 including the keyword-based printing option is shown in FIG. 3. The user interface 300 includes conventional print parameters such as 302, 304, and 306 for submitting the document for printing. In addition, the user interface 300 includes an option (marked as 308) to exclude one or more pages having input keywords, while printing remaining pages of the document. If the user wishes to exclude pages having some specific keywords, then the user selects a check box 310 corresponding to the option 308. Once selected, the user can provide one or more keywords in a text box 314. In the shown example, the user inputs 3 keywords including 'Index' (marked as 312*a*), 'Covers' (marked as 312*b*), and 'Tabs' (marked as 312*c*). These are few examples, and the user can provide any number of keywords, as desired. Although not shown, the user interface 300 may include a sub-option, which can be selected by the user to find pages including all the input keywords. This sub-option can be de-select to identify pages including at least one of the input keywords. Also, any possible variations or combinations of the input keywords can be considered. For example, if the input keyword is "table of content", the variations that can be searched includes 'contents', 'table', 'content table', and so on. The user interface 300 and the provided keyword-based printing option shown here is exemplary in nature and there can be many variations to the option.

Once the user inputs the one or more keywords, he sends the document along with the one or more keywords for printing at a multi-function device of his choice, such as the multi-function device 208.

Once sent, the receiver 210 receives the document along with the one or more input keywords. Upon receiving, the controller 212 searches for the keywords in the document to identify pages having the one or more input keywords. In scenarios where the submitted document is in a non-searchable format (e.g., PDF format), the controller 212 first converts the document to a searchable format (e.g., MS word format). The controller 212 can use a suitable application such as OCR, and the like to convert the document to the searchable format. Then, the controller 212 searches the one or more input keywords in the document. Once the pages including the one or more input keywords are identified, the controller 212 segregates the pages having the keywords from remaining pages of the document.

Once the pages including one or more input keywords are segregated from the remaining pages, the controller 212 may temporarily store the pages having the keywords in the memory 216. The memory 216 may store other details/information required to implement the present disclosure. For instance, the memory 216 may store keywords, pages numbers including the input keyword, remaining pages, and so on.

Subsequently, the user interface 214 displays a preview of the one or more pages that identified with the input keywords, for user's confirmation. The user can look at the preview of the and confirm the exclusion of the one or more pages of his choice. For instance, there can be instances where the user may wish to retain one or more of the identified pages. The user interface 214 provides a feature to deselect one or more pages from the pages identified with the matching one or more keywords. For example, if the user entered a keyword 'preface' and two pages are identified to include the keyword, the user may deselect one of the two pages via the user interface 214. This way only one page is confirmed to be excluded while remaining pages of the document are to be printed.

Once the user submits his selection and confirms the remaining pages to be printed, the controller 212 communicates with the print engine 218. Subsequently, the remaining pages that do not include the input keywords are printed by the print engine 218. In some cases, the user may require deleting the pages that are to be excluded from printing. The user can delete the pages while checking the preview of the identified pages. Once user confirms the pages to be deleted, the controller 212 deletes the pages and communicates with the print engine 218 to print the remaining pages of the document. The print engine 218 then prints the remaining pages of the document. This way, the system 200 allows the user to print the pages of his choice by excluding the pages having one or more keywords from printing.

The controller 212 may use a dynamic algorithm to exclude the pages having one or more input keywords. Once the user submits a document for printing and provides the one or more keywords, the dynamic algorithm removes the unnecessary pages of the document i.e., pages including the matching keywords from the document and prints the remaining pages. For example, if a user wishes to exclude pages including addresses in a document, the user input keywords such as "street" or "road". Based on these input keywords, the algorithm finds the matching keywords and identify pages having exact or matching keywords in the document. Once identified, the algorithm subtracts the pages including the input keywords from the overall print output (i.e., the original document submitted by the user for printing). Then, the controller 212 initiates printing of the remaining pages (i.e., the pages that do not include the input keywords).

One exemplary algorithm is discussed now for the sake of clarity. Once a document is submitted for printing and the user inputs one or more keywords, the algorithm finds a maximum value of total number of pages in the document (i.e., N (max)). Here, N (max) indicates the total number of pages available in the document.

Subsequently, the algorithm finds the keywords input by the user and tag pages including the keywords as (N (TagA)). The value of N (TagA) indicates the number of pages that are identified to include the input keywords. This value is always dynamic as the number of pages where the keywords are available changes based on input keywords. Next, the algorithm re-process the document for (N (max)-N (TagA)), keeping the order of the pages relative to the original. Here, the algorithm subtracts the tagged pages from the total number of pages available in the document. In cases where user requests for a preview, the pages that are tagged to include the input keywords are displayed to the user for his confirmation. Upon confirmation, the updated document is printed. Any know or later developed algorithm can be used to exclude one or more pages from a document, while printing the document.

While in the above implementation, the segregation of pages is done by the controller 212 once the document is submitted at the multi-function device 208, it can be considered that the print driver 204 may include the functionalities to segregate the pages including one or more keywords from the remaining pages. In such cases, the print driver 204 provides the preview of pages identified with the input keywords and upon user's confirmation submits only the remaining pages at the multi-function device. 208. In such a scenario, the multi-function device 208 receives the remaining pages that do not include the input keywords, for printing.

In the above discussed examples, the user interface 206 allows the user to preview the pages that are identified to include the input keywords. For example, if a user has input a keyword 'Image', the preview option allows the user to see all the pages in a document including the keyword 'Image' and its variations such as 'image', 'picture', 'figure', etc. Based on the preview option, the user can deselect one or more pages that are to be print along with the remaining pages, which do not include the input keyword. For instance, in a 10-page document if the keyword 'image' is present in 5 pages, the user may want to retain 1 of these 5 pages for printing. This way, the user can use the preview option to finalize the pages that are to be excluded from printing.

Although FIG. 2 is discussed with respect to the computing device 202 and the multi-function device 208, but the disclosure can be implemented on the multi-function device 208 alone. In such cases, the multi-function device 208 provides the keyword-based printing option to exclude one or more pages of the document based on one or more user-selected keywords. The document to be printed is directly accessed through the multi-function device 208 either via an external storage device such as USB, a hard disk, a memory of the multi-function device, a shared location accessible at the multi-function device, and so on. In such a scenario, the multi-function device 208 implements all the functionalities as discussed above in FIG. 2. To this end, the multi-function device 208 provides the keyword-based printing to the user. The receiver 210 receives the document for printing from the user, where the document includes one or more pages. The user interface 214 includes the keyword-based printing option for user selection, where the keyword-based printing option allows the user to input one or more keywords. The controller 212 identifies one or more pages from the document having the one or more matching keywords input by the user. The one or more pages including the pages are segregated from the remaining pages, which can be temporarily stored in the memory 216. A preview of the pages including keywords can be displayed to the user for confirmation. Once user confirms, the controller 212 excludes the identified one or more pages from the document for printing. Subsequently, the print engine 218 prints the remaining pages of the document.

Exemplary Flowchart

Figure 4:
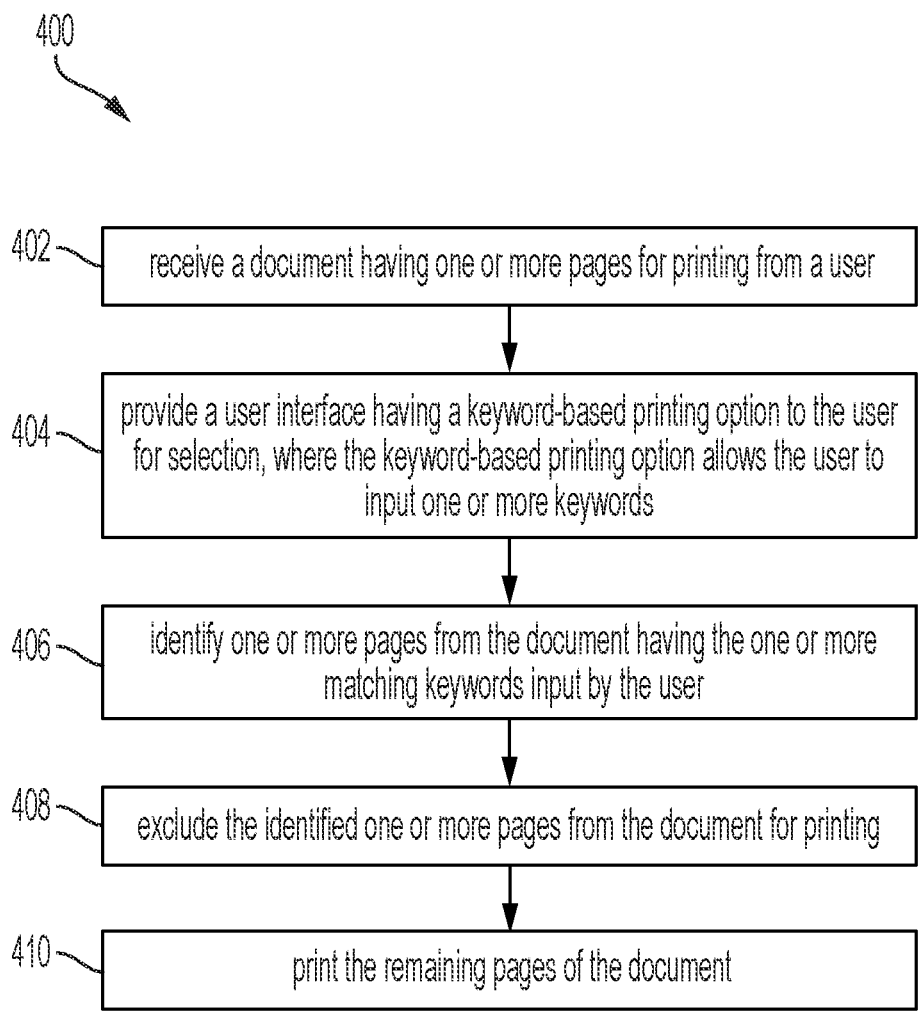
FIG. 4 is a method flowchart for providing keyword-based printing option to a user, in accordance with an embodiment of the present disclosure.

FIG. 4 illustrates an exemplary method 400 for keyword-based printing according to embodiments of the present disclosure. The method 400 is implemented at a multi-function device, such as the multi-function device 106 of FIG. 1B, or the multi-function device 208 of FIG. 2.

The method 400 begins when a user wishes to print a document having one or more pages. At 402, the document is received at the multi-function device. Upon receiving, a user interface having a keyword-based printing option is provided to the user at 404. The keyword-based printing option allows the user to input one or more keywords. Based on the one or more input keywords, one or more pages from the document having the one or more matching keywords are identified, at 406. Once identified, the pages including the one or more input keywords and the remaining pages are segregated. Here, the one or more pages including the one or more matching keywords are segregated from the remaining pages of the document. The pages including the keywords are displayed to the user for confirmation. The display includes a preview of one or more identified pages. For example, if a user submits a 20-page document for printing and input a keyword 'table' to exclude pages including any tables, the preview displays pages that are identified to include the keyword 'table'. In some cases, a few pages that are identified to include the input keyword may not include a table but just includes the keyword 'table' such as 'table of content'. In such cases, the preview option allows the user to deselect such pages, so that the pages that are inadvertently identified for exclusion can be retained. Subsequently, the user submits his selection such that the one or more pages identified to include the input keywords and are not deselected by the user are excluded from printing, at 408. And the remaining pages of the document are printed at 410.

Figure 5:
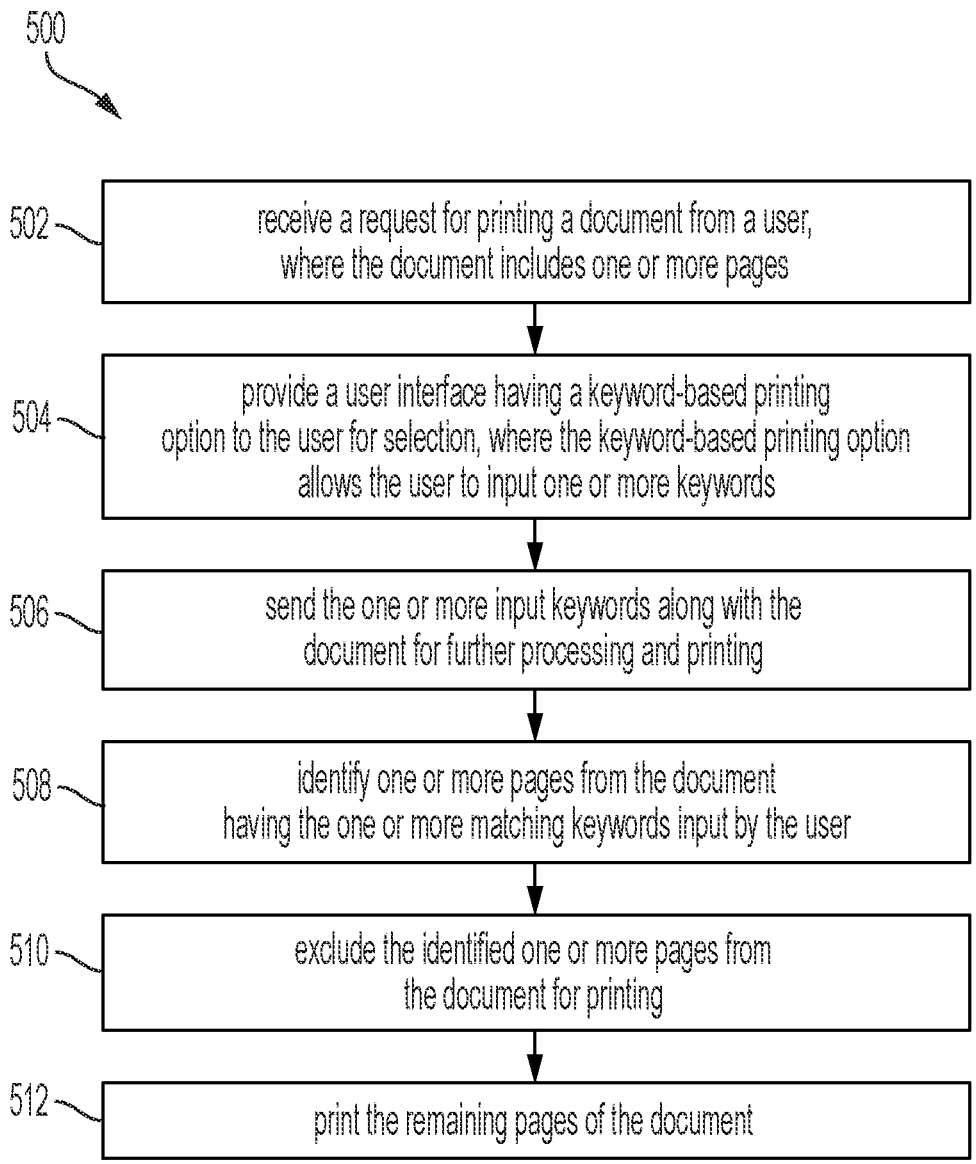
FIG. 5 is another method flowchart for providing keyword-based printing option to a user, in accordance with an embodiment of the present disclosure.

FIG. 5 illustrates another exemplary method 500 for keyword-based printing according to embodiments of the present disclosure. The method 500 is implemented at a system including a computing device and a multi-function device, such as the system 200 of FIG. 2.

The method 500 starts when a user wishes to submit a document for printing, the document includes one or more pages. The user submits the print request for printing the document using his computing device. Once the print request is received at 502, a user interface is displayed/provided to the user at 504. The user interface includes conventional print parameters for user's selection. Various examples of the print parameters include print all pages, print pages based on page numbers, areas, range or the like. The user selects one or more of these print parameters for printing. In context of the present disclosure, the user selects the print parameters via a user interface of a print driver application that is pre-installed on the computing device. The user interface also includes a keyword-based printing option for user's selection. In method 500, the user wishes to exclude a few pages of the document from printing, so he selects the keyword-based printing option. Selecting the option allows the user to input one or more keywords. Based on the one or more input keywords, one or more pages of the document including the keywords can be excluded from printing and the remaining pages can be printed. For example, if the user has a document of 10 pages and he wishes to exclude pages including preface and index sections, the one or more keywords provided by the user are 'preface' and 'index'.

Once the user provides the keywords, the one or more input keywords along with the document is sent to the multi-function device for printing, at 506. Once received, at 508, the multi-function device identifies the one or more pages from the document having the one or more matching keywords input by the user. For instance, if the one or more keywords include 'preface' and 'index', the document is searched to identify pages including the keywords 'preface' and 'index'. The document is also searched to identify matching keywords that may not be exact same as that of the input keywords but are related to the keywords. Exemplary matching keywords for the input keywords 'preface' and 'index' can be 'prelude', 'preamble', 'foreword', 'indexed' and so on. At this stage, if the submitted document is in a non-searchable format, the multi-function device first converts the document to a searchable format. Then, the document is searched to include the one or more input keywords.

Once searched, pages including the one or more input keywords are segregated from the remaining pages of the document that do not include the input keywords. In some cases, a preview of the pages that are identified to include the one or more input keywords is displayed to the user for his confirmation. The preview of identified pages allows the user to confirm if he wishes to exclude all the identified pages. In some scenarios, the user deselects one or more of the identified pages. For instance, if the input keyword includes 'image' as the user is willing to exclude pages having images or figures in the document, one or more identified pages may include the keyword 'image' without including any image/figure. In such cases, the user looks at the preview of all the identified pages and deselect the page that he wants to retain/print. At this stage, the user may delete the one or more pages having the one or more keywords input by the user. Once, the user confirms the pages that are to be excluded from printing, the identified pages are excluded at 510. Subsequently, the remaining pages of the document are printed at 512. This way, the identified one or more pages having the one or more input keywords are not printed.

The methods 400 and 500 may be implemented by non-transitory computer-readable medium storing instructions, which when executed by one or more processors cause the one or more processors to implement the method blocks 402-410 and 502-512, respectively. For example, in method 400, the non-transitory computer-readable medium including instructions executable by a processing resource to: receive a document having one or more pages for printing from a user; provide a user interface having a keyword-based printing option to the user for selection, where the keyword-based printing option allows the user to input one or more keywords; identify one or more pages from the document having the one or more matching keywords input by the user; exclude the identified one or more pages from the document for printing; and print the remaining pages of the document.

Further, in the method 500, the non-transitory computer-readable medium including instructions executable by a processing resource to: receive a request for printing a document from a user, wherein the document includes one or more pages; provide a user interface including a keyword-based printing option for selection, wherein the keyword-based printing option allows the user to input one or more keywords; send the one or more input keywords along with the document further processing and printing; identify one or more pages from the document having the one or more matching keywords input by the user; exclude the identified one or more pages from the document for printing; and print the remaining pages of the document Additionally, the non-transitory computer-readable medium including instructions executable by a processing resource to receive a selection of an option to exclude one or more pages while printing a document. The non-transitory computer-readable medium including instructions executable by a processing resource to search the one or more keywords in the document. The non-transitory computer-readable medium including instructions executable by a processing resource to separate the one or more pages having one or more keywords as input by the user, from the other pages of the document for printing. The non-transitory computer-readable medium including instructions executable by a processing resource print the one or more pages that do not include the one or more keywords and exclude the pages having the keywords.

The present disclosure discloses methods and systems for excluding one or more pages of a document from printing and prints the remaining pages of the document. The methods and systems avoid any manual work by the user as he is not required to manually identify and/or separate pages that are not required to be printed while printing the document. This way user's time and effort is saved, as he can directly print the pages of the document that are to be printed while excluding the unwanted pages. The methods and systems eliminate the man-made error that can otherwise be made if the user is required to manually separate the pages to be excluded from printing. The methods and systems enhance user experience and is very easy to implement. Also, the user is not required to use any third part application for removing or excluding pages of the document that are not required to be printed, while printing the document.

The present disclosure successfully excludes and/or deletes one or more pages of the document from printing, based on user specified keywords and ensures that pages including matching keywords are excluded from printing while remaining pages are printed. This automates the printing process, and the user is no more required to manually identify and delete the pages based on keywords. Therefore, a lot of time can be saved.

The methods and systems allow automatic identification of pages based on searching of the user input keywords by the multi-function device. So, the user is not required to manually search the keywords and identify the pages that are to be excluded from printing, while printing the document.

The present disclosure proposes a simple yet effective way of printing a portion of the document while excluding pages that are not required to be printed.

The present disclosure uses dynamic algorithm for excluding the pages from the document based on user-input keywords. Since the algorithm dynamically changes based on input keywords, the user is not required to keep any rules or maintain the rules in a memory, as rules to exclude pages vary from document to document.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, searching, identifying, sending, segregating, excluding, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing keyword-based printing to a user, the method comprising:
   receiving a request for printing a document from a user, wherein the document comprises one or more pages;
   providing a user interface comprising a keyword-based printing option to the user for selection, wherein the keyword-based printing option allows the user to input one or more keywords;
   sending the one or more input keywords along with the document for further processing and printing;
   identifying one or more pages from the document having the one or more matching keywords input by the user;
   excluding the identified one or more pages from the document for printing; and
   printing the remaining pages of the document.

2. The method of claim 1, further comprising, searching for the one or more keywords in the document.

3. The method of claim 1, further comprising, segregating the one or more pages having the one or more keywords input by the user from the remaining pages of the document.

4. The method of claim 1, further comprising, deleting the one or more pages having the one or more keywords inputs by the user from the document.

5. The method of claim 1, further comprising, displaying a preview of the one or more pages to be excluded from printing, for user confirmation.

6. The method of claim 1, wherein the one or more pages having the one or more keywords input by the user are excluded from printing.

7. The method of claim 1, further comprising, not printing the identified one or more pages having the one or more input keywords.

8. The method of claim 1, further comprising, matching one or more possible combinations of the one or more input keywords.

9. A system for providing keyword-based printing to a user, the system comprising:
   a computing device having a print driver for:
      receiving a request for printing a document from a user, wherein the document comprises one or more pages;
      providing a user interface comprising a keyword-based printing option to the user for selection, wherein the keyword-based printing option allows the user to input one or more keywords;
      sending the one or more input keywords along with the document to a multi-function device for further processing and printing;
   the multi-function device for:
      identifying one or more pages from the document having the one or more matching keywords input by the user;
      excluding the identified one or more pages from the document for printing; and
      printing the remaining pages of the document.

10. The system of claim 9, wherein the multi-function device is for searching the one or more keywords in the document.

11. The system of claim 9, wherein the multi-function device is for segregating the one or more pages having the one or more keywords input by the user from the remaining pages of the document.

12. The system of claim 9, wherein the multi-function device is for deleting the one or more pages having the one or more keywords input by the user from the document.

13. The system of claim 9, wherein the multi-function device comprises a user interface for displaying a preview of the one or more pages to be excluded from printing, for user confirmation.

14. The system of claim 9, wherein the one or more pages having the one or more keywords input by the user are excluded from printing.

15. A method for providing keyword-based printing to a user, the method comprising:
   receiving a document for printing from a user, wherein the document comprises one or more pages;
   providing a user interface comprising a keyword-based printing option to the user for selection, wherein the keyword-based printing option allows the user to input one or more keywords;
   identifying one or more pages from the document having the one or more matching keywords input by the user;
   excluding the identified one or more pages from the document for printing; and
   printing the remaining pages of the document and not printing the one or more identified pages having the one or more matching keywords.

16. The method of claim 15, further comprising, segregating the one or more pages having the one or more keywords input by the user from the remaining pages of the document.

17. The method of claim 15, further comprising, deleting the one or more pages having the one or more keywords inputs by the user from the document.

18. The method of claim 15, further comprising, displaying a preview of the one or more pages to be excluded from printing, for user confirmation.

19. The method of claim 15, wherein the one or more pages having the one or more keywords input by the user are excluded from printing.

20. A multi-function device for providing keyword-based printing to a user, the multi-function device comprising:
   a receiver for receiving a document for printing from a user, wherein the document comprises one or more pages;
   a user interface comprising a keyword-based printing option for user selection, wherein the keyword-based printing option allows the user to input one or more keywords; and
   a controller for:
      identifying one or more pages from the document having the one or more matching keywords input by the user;
      excluding the identified one or more pages from the document for printing; and
   a print engine for printing the remaining pages of the document.

21. The multi-function device of claim 20, wherein the controller is for, deleting the one or more pages having the one or more keywords inputs by the user from the document.

22. The multi-function device of claim 20, wherein the controller is for, displaying a preview of the one or more pages to be excluded from printing, for user confirmation.

* * * * *